(12) United States Patent
Oppermann

(10) Patent No.: US 6,216,430 B1
(45) Date of Patent: Apr. 17, 2001

(54) SPINNING MACHINE WITH A MULTIPLICITY OF ELECTRICAL LOADS

(75) Inventor: Ingo Oppermann, Neuhausen (DE)

(73) Assignee: Zinser Textilmaschinen GmbH, Ebersbach/Fils (DE)

( * ) Notice: Subject to any disclaimer, the term of this patent is extended or adjusted under 35 U.S.C. 154(b) by 0 days.

(21) Appl. No.: 09/518,449

(22) Filed: Mar. 3, 2000

(30) Foreign Application Priority Data

Mar. 6, 1999 (DE) .............................................. 199 09 969

(51) Int. Cl.[7] .................. D01H 4/00; H02P 1/00; H02B 3/00
(52) U.S. Cl. ................ 57/1 R; 57/400; 57/406; 439/580; 439/668
(58) Field of Search ............................. 57/1 R, 400, 406; 439/580, 668

(56) References Cited

FOREIGN PATENT DOCUMENTS

4133585 * 12/1992 (DE) .
41 33 585   12/1992 (DE) .

* cited by examiner

*Primary Examiner*—John J. Calvert
*Assistant Examiner*—Shaun R Hurley
(74) *Attorney, Agent, or Firm*—Herbert Dubno

(57) ABSTRACT

A spinning machine in a plurality of sections has its electrical loads, especially motors, yarn feeders, stretching and heating devices supplied with electrical energy through cable segments stretching the length of the respective machine section and having plug-and-jack connectors at opposite ends. From one of these connectors a section conductor can run to all of the loads of a given type in the respective section. The cable segments are connected together upon assembly of the spinning machine from its sections.

9 Claims, 3 Drawing Sheets

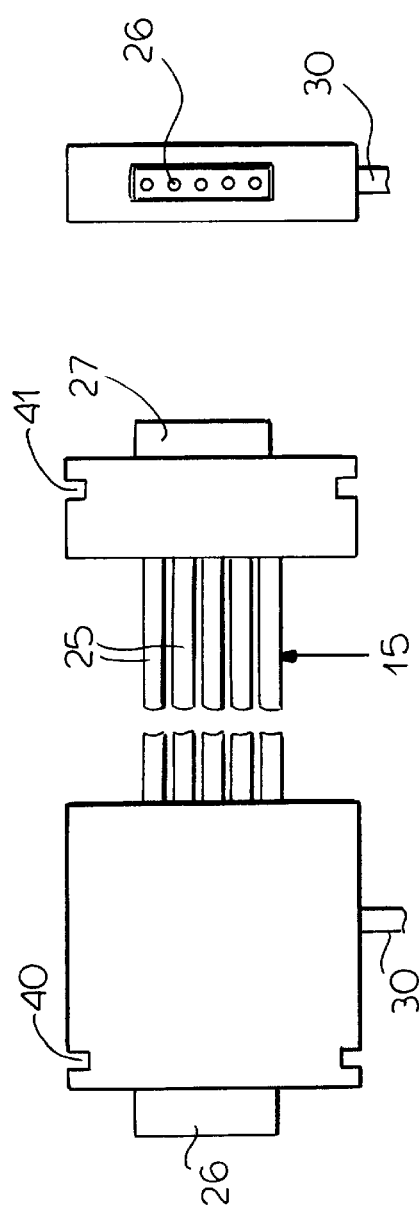
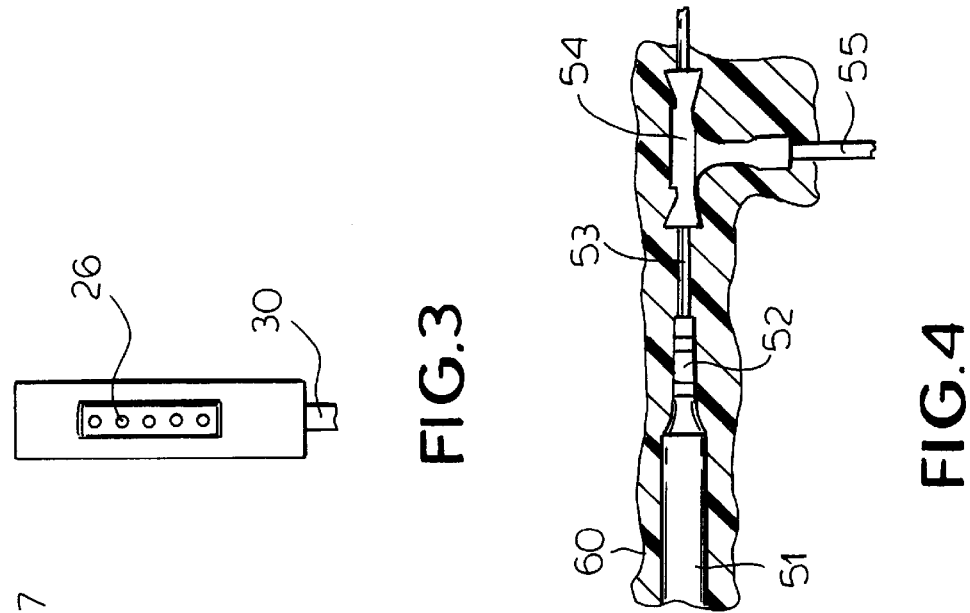
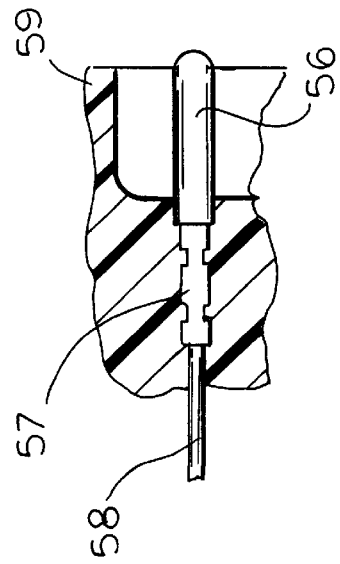
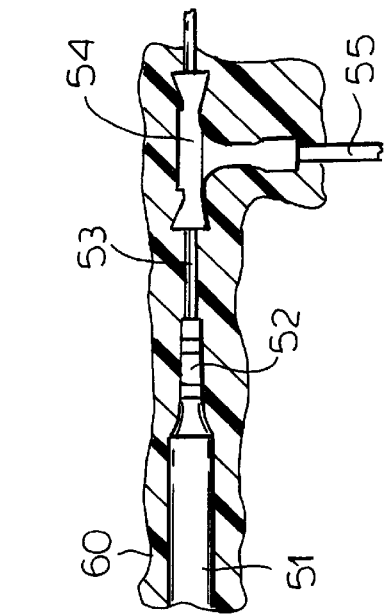

SPINNING MACHINE WITH A MULTIPLICITY OF ELECTRICAL LOADS

FIELD OF THE INVENTION

My present invention relates to a spinning machine with a multiplicity of electrical loads, in particular spread along the length of the machine and in different sections of the machine. The term "electrical loads" as used herein is intended to refer to motors, yarn or filament-supply mechanisms, drafting and stretching mechanisms, heating units and the local systems for supplying these loads with electrical energy.

BACKGROUND OF THE INVENTION

From DE 41 33 585, for example, a current-distribution system for a spinning machine is provided in which the conductors are in the form of conductive rails which can have the configuration of slit tubes and can be connected to a source of electrical energy and to the loads. In the current-conducting rails, terminals or connectors can be engaged under a spring force so that the terminal is received within the tube and the tube acts as an enclosure surrounding the terminal. The terminal elements themselves may have the configuration of sleeves which can have a contact tongue which, emerging from the slit tube, serves to connect the terminal to the load.

The current-conducting rails may be set in rail-like bodies or enclosures of an insulating material, especially a synthetic resin.

OBJECTS OF THE INVENTION

It is the principal object of the present invention to provide a spinning machine having a multiplicity of electrical loads, for example, motors, yarn feeders or suppliers, filament and yarn-stretching units and heating devices or the like such that the mounting and assembly costs can be reduced and thus the overall machine cost can be lowered and which will have a connection system between the electrical source and the load which is more reliable and more easily set up than earlier systems.

Another object of the invention is to provide a more versatile system for electrically supplying a plurality of electrical loads distributed along a spinning machine.

Still another object of the invention is to provide a spinning machine having an electrical distribution system which overcomes drawbacks of prior art systems.

SUMMARY OF THE INVENTION

These objects and others which will become apparent hereinafter are attained by providing an electrical-distribution system in which a cable extends along the length of the spinning machine and is composed of a plurality of cable segments each having a length corresponding to a section length of the machine and provided at its ends with plug-and-jack connectors so that the segments can be connected end-to-end by insertion of a respective plug in the jack of an adjacent segment. According to the invention, the connector at one end of each cable segment is provided with a conductor for supplying at least one of the electrical loads of the respective section of the machine and preferably all of the loads of a given type in that machine section.

More particularly, a spinning machine according to the invention has a multiplicity of spinning stations and is subdivided along its length into a plurality of sections, each of the sections having a plurality of pipes of electrical loads including motors, yarn feeders, yarn-stretching or drawing devices and yarn-heating devices. The electricity supply means for those loads includes at least one cable formed from a plurality of cable segments each extending along a respective one of the sections and formed at opposite ends with plug connectors and jack connectors plugged end-to-end with a plug connector of one cable segment plugged into a jack connector of an adjacent cable segment, and at least one section conductor extending out of at least one of the plug-and-jack connectors of each cable segment and running to at least one of the electric loads of the respective section.

Each cable segment is, advantageously, prefabricated with the plug-and-jack connector at its ends and, the section conductor is connected during fabrication of the respective section of the machine to the load or loads to be supplied by that cable segment at the side at which the machine is to be installed the cable segments are connected end-to-end.

The result is a significant reduction in mounting time. Each section of the machine, normally encompassing a multiplicity of work stations (for example 8 or 16 work stations), can be completely preassembled with the respective cable segment or segments for the particular electrical loads thereof.

Upon assembly of the individual sections at the installation site, the respective plugs-and-jacks are connected together. At one end of the cable, either at the plug or at the jack, a section conductor extends to the electrical loads of at least one type.

Within a section advantageously all of the electrical loads having the same function, i.e. of the same type, for example, the motors for driving the spindles, can be connected collectively to a respective section conductor.

According to a further feature of the invention, the jacks and/or the plugs are connected with the respective cable ends and/or the section conductor by crimp connectors. The housing or enclosure for the plugs and/or jacks may be composed of synthetic resin and can be cast around the crimp connectors to form respective housings. The housings, moreover, may be provided with fixing elements, e.g. recesses or bores, which enable the connectors which are joined end-to-end to be held together and to parts of the frame of the respective machine section. In the preferred embodiment of the invention, all of the sections are prewired with one or more cable segments and then, upon assembly of the sections to form the machine, the segments are interconnected.

BRIEF DESCRIPTION OF THE DRAWING

The above and other objects, features, and advantages will become more readily apparent from the following description, reference being made to the accompanying drawing in which:

FIG. 2 is an elevational view of a cable segment showing the plug-and-jack connectors, their housings and recesses for fixing the cable segment within a respective machine section;

FIG. 3 is a front elevational view of the plug end of the cable;

FIG. 4 is a cross sectional view showing the detail of the jack connector;

FIG. 5 is a cross sectional view of a detail of the plug connector;

SPECIFIC DESCRIPTION

Figure 1:
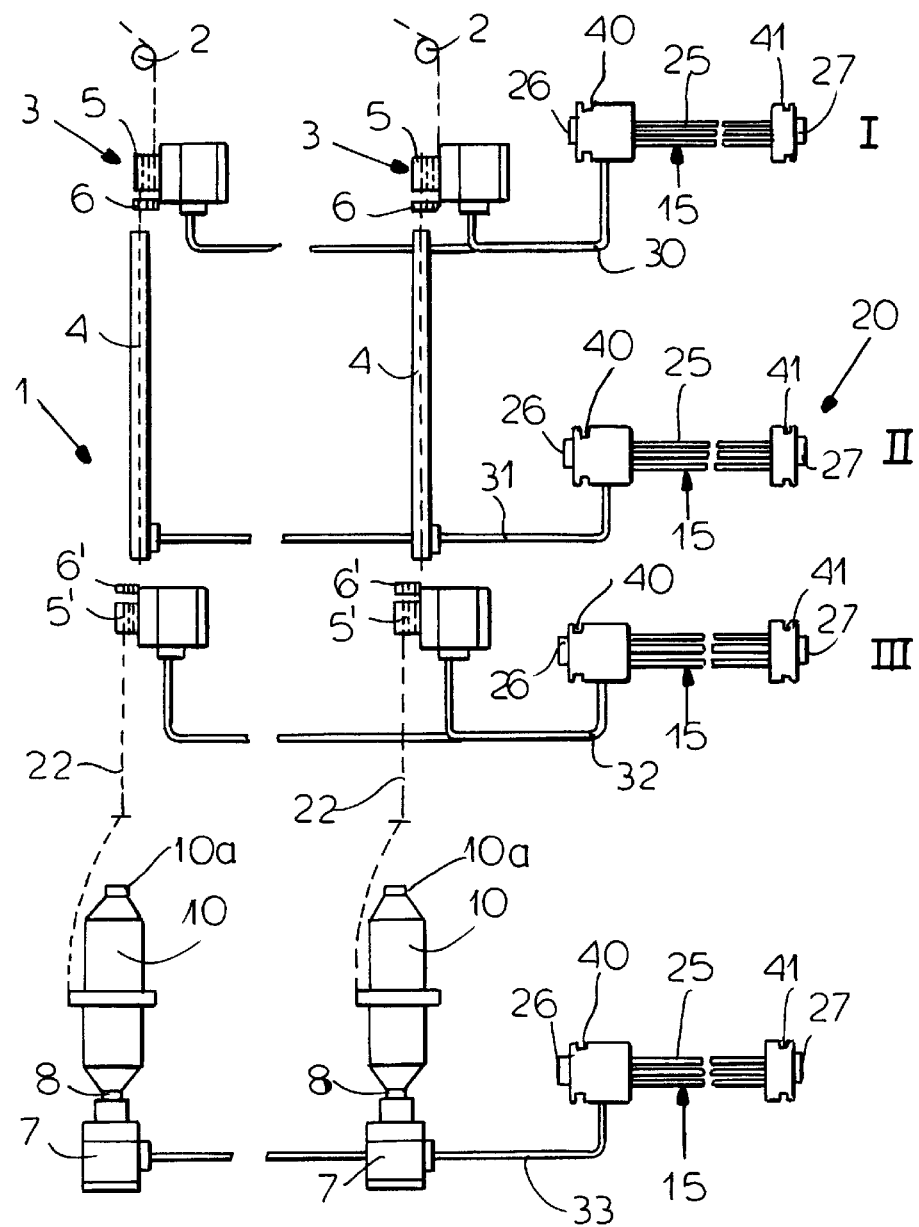
FIG. 1 is a schematic side view of a spinning machine with a plurality of work stations and receiving the electrical supply from respective cable sections.

FIG. 1 shows a spinning machine 1 for a synthetic resin yarn utilizing a multiplicity of electrical loads distributed along the machine and, as is conventional with such spinning machines, having groups of working stations with 8 or 16 spindles per group, in respective sections of the machine, the sections being connected together. Each section may have its own framework 50, 50' of which only two walls are shown for successive sections in FIG. 6, on which the remaining components of each section of the machine are mounted.

For example, the electrical loads for each working station can, in the direction of travel of a yarn 22, include a supply or feeder 2 for the yarn, a stretching unit 3 with its gallets 5 or 5' for imparting stretch to the synthetic resin filaments forming the yarn and which are to be spun together, the auxiliary rollers 6 or 6' around which the yarn is looped from each gallet and heating units 4 which may include electrical heaters along which the yarn travels between pairs of gallets. The yarn can then travel to the respective bobbins on spindles 8 driven by motors 7. The bobbins, here represented at 10, are wound on bobbin cores or sleeves 10a which can be fitted onto the spindle 8.

The apparatus can also include a current-supply system 20 for supplying the electrical loads with energy. The current-supply system 20 can include cable segments 25 fitted with plugs 26 and jacks 27 at their ends. Each of the cable segments is also equipped with a section conductor 30, 31, 32 and 33 which emerges from one of the connectors at the end of each cable segment to supply at least one of the electrical loads and preferably is connected to all of the electrical loads of a given type. For example, in particular the machine section of the uppermost segment 25, the section conductor 30 is a harness running to all of the upper gallets 5. For the next lower cable segment 25, the section conductor from the plug 26 is a harness 31 supplying the resistance heaters 4.

The segment 25 of the zone III has a section conductor 32 forming a harness supplying the lower gallets 5' and the final cable segment 25 has a section conductor 33 forming a harness supplying the motors 7.

Figure 6:
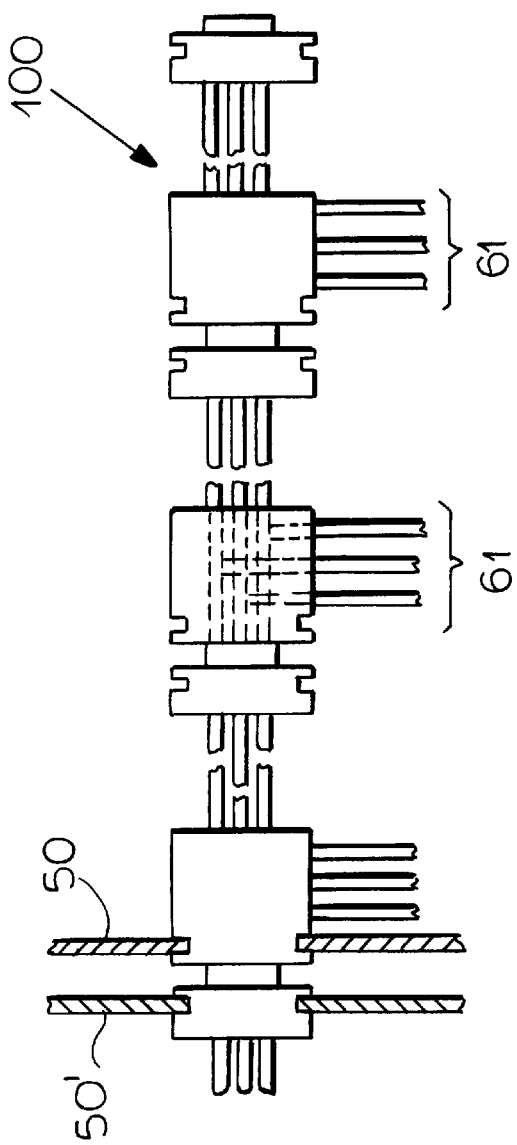
FIG. 6 is a diagrammatic elevational view showing the connection of segments of successive sections of a spinning machine.

Each of the section conductors may be premounted in a respective section I, II, III and IV of the machine and the plug-and-jack connectors of the successive sections may be connected end-to-end as shown in FIG. 6 when the apparatus is installed.

Figure 7:
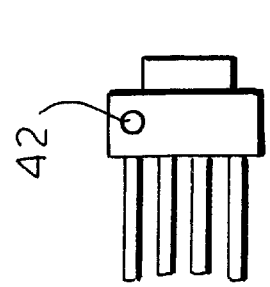
FIG. 7 is a fragmentary elevational view of one of the connectors showing an alternative fixing system.

The contacts of the connectors may be crimp-type connectors as has been shown in FIGS. 4 and 5. In FIG. 4, for example, a sleeve contact 51 is shown to have its crimped end 52 crimped to a conductor 53 traversing a T-connector 54 which is likewise crimped to the conductor 53 and to a section conductor 55 forming one of the section conductors 30 to 33. Similarly, a plug member 56 (FIG. 5) has an end 57 crimped to the wire 58. The plastic housings 59 and 60 are cast around the conductors contained in the respective connectors. The housings are provided with fixing elements, for example, recesses 40 and 41 or holes 42 (FIG. 7) to enable the housings to be connected to the wall structures 50 and 50' of the respective machine sections or other support elements of the spinning machine.

By prefabricating the cable segments with plugs-and-jacks and assembling them with their harnesses connected to the respective electrical loads and connecting the segments end-to-end, the assembly costs are greatly reduced. Each cable segment can form a harness as well with a number of conductors 15 each connected to a respective section conductor as shown for the groups a section conductor 61 in FIG. 6.

In this manner, separate conductors of each cable segment and hence of the assembled cable 100 can run to the groups of loads from the control unit of the machine. The section conductors can extend from either the plug or jack connector. Within each section, all of the loads of a single type are connected to a respective section conductor so that, for example, where there are 8 stations per section, all 8 spindle drive motors for each section will be connected to a respective section connector. Within each section, all of the loads of a single type are connected to a respective section conductor so that, for example, where there are 8 stations per section, all 8 spindle-drive motors for each section will be connected to a respective section conductor of the respective cable segment.

I claim:

1. A spinning machine having a multiplicity of spinning stations and subdivided along a length of the machine into a plurality of sections, each of said sections having a plurality of types of electrical loads including motors, yarn feeders, yarn-drawing devices and yarn-heating devices, and electricity supply means for supplying electricity to said loads, said electricity supply means including at least one cable formed from a plurality of cable segments each extending along a respective one of said sections and formed at opposite ends with plug connectors and jack connectors plugged end to end with a plug connector of one cable segment plugged into a jack connector of an adjacent cable segment, and at least one section conductor extending out of at least one of the plug and jack connectors of each cable segment and running to at least one of the electric loads of the respective section.

2. The spinning machine defined in claim 1 wherein all of the electrical loads of at least one type in each section are connected to said cable by the respective section conductor.

3. The spinning machine defined in claim 1 wherein conductors of said cable and terminals of said connectors are crimped together for each cable segment.

4. The spinning machine defined in claim 1 wherein each section conductor is connected to the respective cable segment by a crimped connector.

5. The spinning machine defined in claim 1 wherein said connectors have housings of cast synthetic resin.

6. The spinning machine defined in claim 1 wherein said connectors have housings formed with fixing means for attaching said connectors to a structural part of the machine.

7. The spinning machine defined in claim 6 wherein said fixing means are grooves formed in said housings.

8. The spinning machine defined in claim 6 wherein said fixing means include bores in said housings.

9. The spinning machine defined in claim 1 wherein each of said sections is prewired with at least one cable segment and said sections are then assembled, connecting said segments end-to-end with said plug and jack connectors.

* * * * *